United States Patent
Hughes et al.

(10) Patent No.: US 9,021,506 B2
(45) Date of Patent: Apr. 28, 2015

(54) RESOURCE EJECTABILITY IN MULTIPROCESSOR SYSTEMS

(75) Inventors: Nathan Jared Hughes, Ft. Collins, CO (US); Stephen Patrick Hack, Livermore, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1425 days.

(21) Appl. No.: 11/880,957

(22) Filed: Jul. 25, 2007

(65) Prior Publication Data

US 2008/0184275 A1 Jul. 31, 2008

Related U.S. Application Data

(63) Continuation-in-part of application No. 11/626,957, filed on Jan. 25, 2007.

(51) Int. Cl.
G06F 9/44 (2006.01)
G06F 9/50 (2006.01)

(52) U.S. Cl.
CPC ............ *G06F 9/4411* (2013.01); *G06F 9/5011* (2013.01); *G06F 9/4413* (2013.01); *G06F 9/5022* (2013.01)

(58) Field of Classification Search
None
See application file for complete search history.

(56) References Cited

U.S. PATENT DOCUMENTS

| | | | |
|---|---|---|---|
| 5,930,110 A * | 7/1999 | Nishigaki et al. | 361/679.43 |
| 6,260,068 B1 * | 7/2001 | Zalewski et al. | 709/226 |
| 7,024,507 B2 * | 4/2006 | Inui et al. | 710/300 |
| 7,502,803 B2 * | 3/2009 | Culter et al. | 1/1 |
| 2005/0289359 A1 * | 12/2005 | Mori et al. | 713/193 |

* cited by examiner

*Primary Examiner* — Qing Wu
(74) *Attorney, Agent, or Firm* — Caven & Aghevli LLC

(57) ABSTRACT

In one embodiment, a multiprocessor computer system comprises at least a first partition having a first operating system and a second partition having a second operating system, comprising logic in the first operating system to generate a request to remove a device from the first partition, logic in a firmware module in the computer system to invoke an ACPI interface eject method for the device in response to the request to remove the device, determine whether the device has memory spaced allocated to it by firmware in the computer system, and reject the ACPI interface eject method when the device has memory spaced allocated to it by firmware in the computer system.

14 Claims, 8 Drawing Sheets

RESOURCE EJECTABILITY IN MULTIPROCESSOR SYSTEMS

RELATED APPLICATIONS

This application is a continuation-in-part of U.S. patent application Ser. No. 11/626,957, entitled METHOD AND SYSTEM FOR RESOURCE ALLOCATION, filed Jan. 25, 2007, the disclosure of which is incorporated herein by reference in its entirety.

BACKGROUND

High performance computer systems may utilize multiple processors to increase processing power. Processing workloads may be divided and distributed among the processors, thereby reducing execution time and increasing performance. One architectural model for high performance multiple processor system is the cache coherent Non-Uniform Memory Access (ccNUMA) model. Under the ccNUMA model, system resources such as processors and random access memory may be segmented into groups referred to as Locality Domains, also referred to as "nodes" or "cells". Each node may comprise one or more processors and physical memory. A processor in a node may access the memory in its node, sometimes referred to as local memory, as well as memory in other nodes, sometimes referred to as remote memory.

Multi-processor computer systems may be partitioned into a number of elements, or cells. Each cell includes at least one, and more commonly a plurality, of processors. The various cells in a partitioned computer system may run different operating systems, if desired. Typically, each partition runs a single operating system.

Many computer systems provide the ability to remove or eject hardware devices from the computer system. For example, some computer systems implement the Advanced Configuration and Power Interface (ACPI), which provides a method to remove hardware resources from an operating system while the operating system is running. This is sometimes referred to as a "hot" removal. In systems that implement the ACPI, system firmware may track which devices are removable and maintain status information relating to those devices.

In some circumstances, it may be useful to move one or more resources from one partition to another partition in a multiprocessor computer system. For example, most computer systems have multiple memory devices, ranging from cache memory to main memory devices including random access memory (RAM) devices (e.g., dynamic RAM or static RAM devices) as well as other types of memory such as read only memory (ROM) devices or external memory devices. In some computer systems, not only specific devices but also memory portions or locations within the various hardware devices also potentially are divisible and potentially allocable. Also for example, most computer systems have one or more processing devices (e.g., central processing units (CPUs) such as microprocessors), and the processing power of these devices can allocated to different processes.

In some computer systems the allocation of resources to the multiple processes of such conventional computer systems is rigidly fixed, either permanently when the computer systems are built or when the computer system are turned on or rebooted. Such rigid allocation of resources can be undesirable, since the needs of the processes can change over time during their operation.

DETAILED DESCRIPTION

Described herein are examples of multi-processor computer systems and of techniques to manage the removal or ejection of devices from partitions in multi-processor systems. In some implementations, the methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1B:
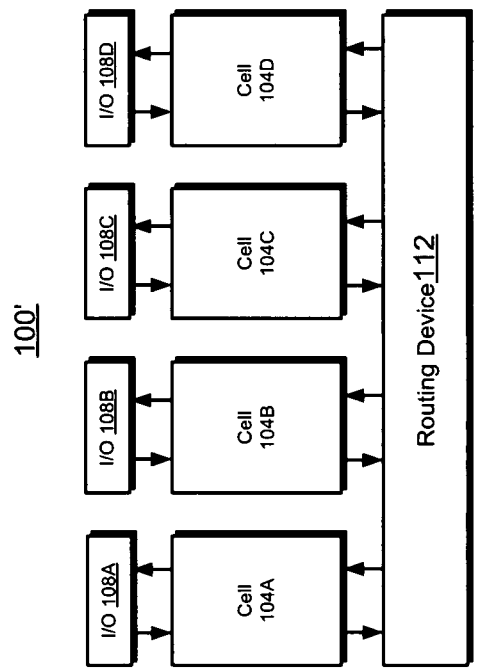
FIGS. 1A, 1B and 1C are schematic illustrations of one embodiment of a multiprocessor computer system according to embodiments.
Figure 1A:
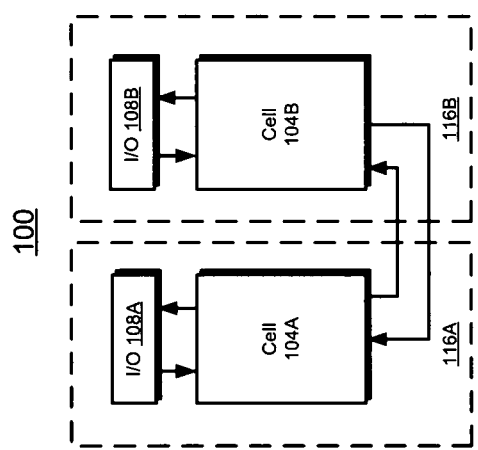
Figure 1C:
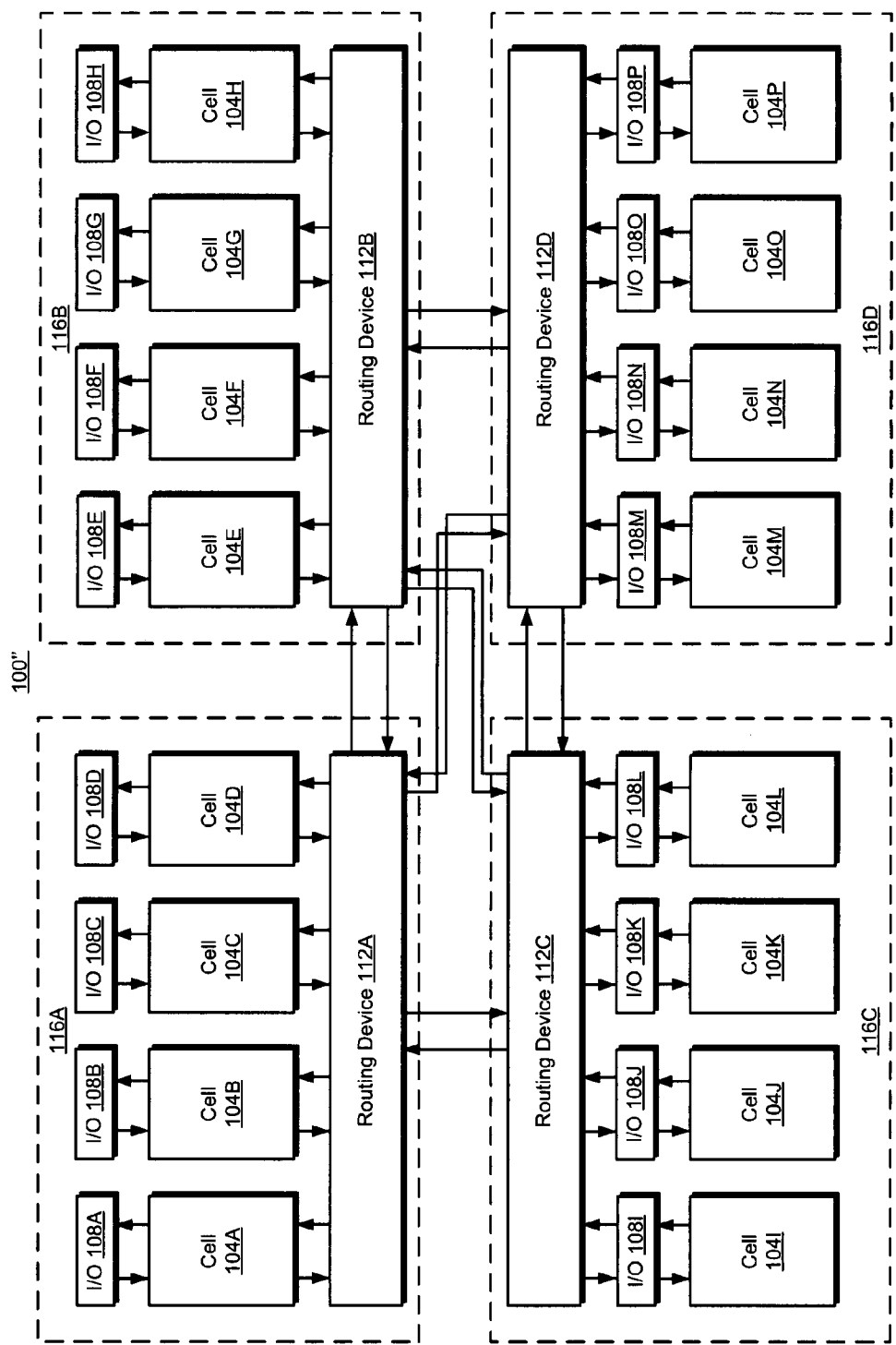

With reference to FIGS. 1A, 1B, and 1C, a partitionable computer system 100 can include a number of elements or cells 104. In FIG. 1A, only two cells 104A and 104B are present. However, more than two cells 104 can create the partitionable computer system 100. For example, FIG. 1B depicts a partitionable computer system 100' having four cells 104A, 104B, 104C, and 104D. In FIG. 1C, sixteen cells 104A, 104B, 104C, 104D, 104E, ... 104P, create the partitionable computer system 100". Each cell 104 can communicate with a respective input and output module 108, which is used to provide input to the system 100 and output from the system 100.

In partitionable computer systems having more than two cells 104, for example systems 100' and 100" shown in FIGS. 1B and 1C, respectively, the cells 104 can communicate with each other through a routing device 112. The routing device can be a crossbar switch or other similar device that can route data packets. For example, a NUMAflex 8-Port Router Interconnect Module sold by SGI of Mountain View, Calif. can be used. The routing device 112 facilitates the transfer of packets from a source address to a destination address. For example, if cell 104A sends a packet to cell 104D, cell 104A sends the packet to the routing device 112, the routing device 112 in turn, transmits the packet to cell 104D.

In a larger partitionable computer system, such as the system 100" shown in FIG. 1C, there can be more than one routing device 112. For example, there can be four routing devices 112A, 112B, 112C, and 112D. The routing devices 112 collectively can be referred to as the switch fabric. The routing devices 112 can communicate with each other and a number of cells 104. For example, cell 104A, cell 104B, cell 104C and cell 104D can communicate directly with routing device 112A. Cell 104E, cell 104F, cell 104G, and cell 104H can communicate directly with routing device 112B. Cell 104I, cell 104J, cell 104K, and cell 104L can communicate directly with routing device 112C. Cell 104M, cell 104N, cell 104O, and cell 104P can communicate directly with routing device 112D. In such a configuration, each routing device 112 and the cells 104 that the routing device 112 directly communicates with can be considered a partition 116. As shown, in FIG. 1C there are four partitions 116A, 116B, 116C and 116D. As shown, each partition includes four cells, however; any number of cells and combination of cells can be used to create a partition. For example, partitions 116A and 116B can be combined to form one partition having eight cells. In one embodiment, each cell 104 is a partition 116. As shown in FIG. 1A, cell 104 can be a partition 116A and cell 104B can be a partition 116B. Although the embodiment depicted in FIG. 1C has four cells, other embodiments may have more or fewer cells.

Each partition can be dedicated to perform a specific computing function. For example, partition 116A can be dedicated to providing web pages by functioning as a web server farm and partition 116B can be configured to provide diagnostic capabilities. In addition, a partition can be dedicated to maintaining a database. In one embodiment, a commercial data center can have three tiers of partitions, the access tier (e.g., a web farm), application tier (i.e., a tier that takes web requests and turns them into database queries and then responds to the web request) and a database tier that tracks various action and items.

Figure 1D:
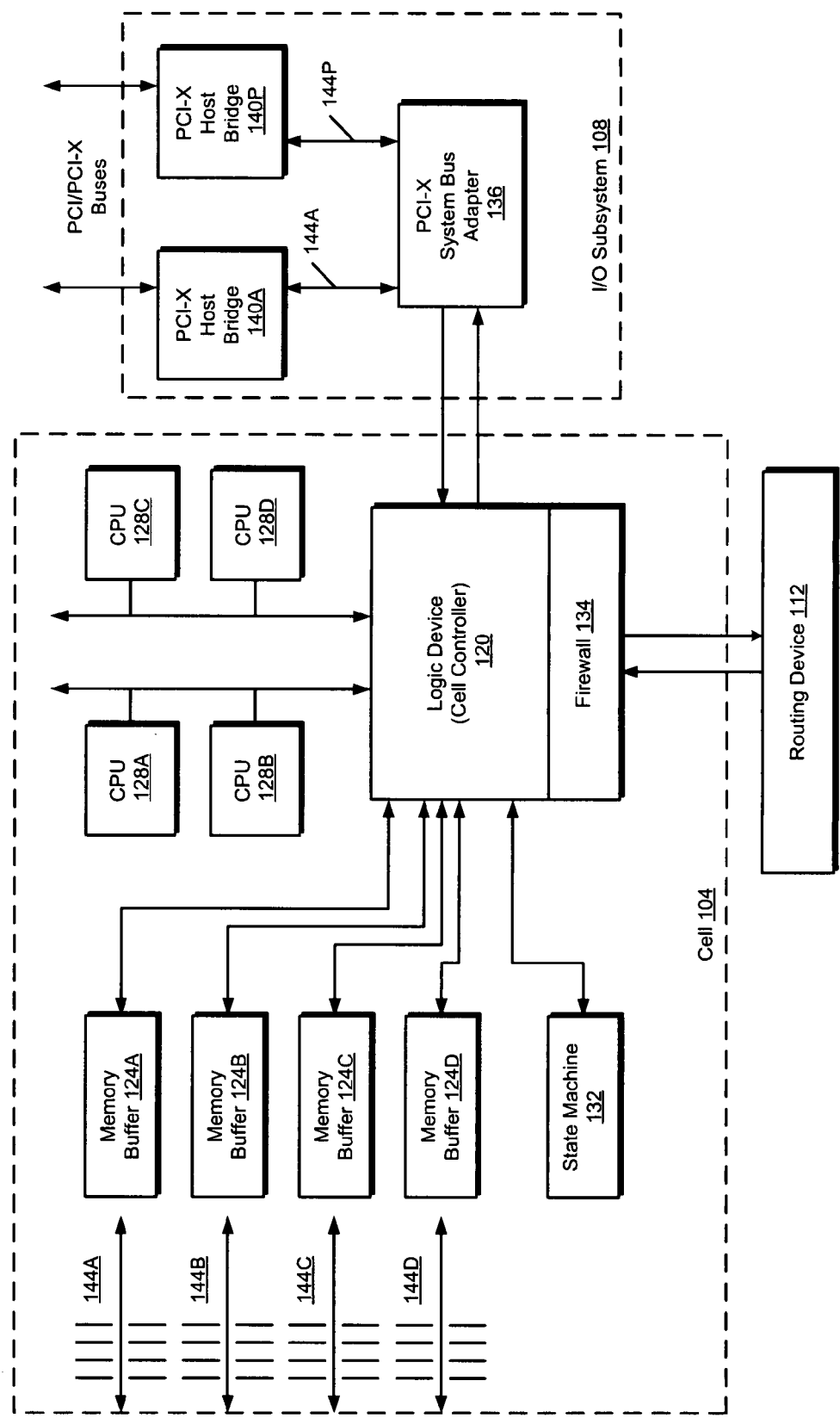
FIG. 1D is a block diagram of a cell, such as the cell depicted in FIG. 1B, according to some embodiments.

With reference to FIG. 1D, each cell 104 includes a logic device 120, a plurality of memory buffers 124A, 124B, 124C, 124D (referred to generally as memory buffers 124), a plurality of central processing units (CPUs) 128A, 128B, 128C, 128D (referred to generally as CPUs 128), a state machine 132, and a firewall 134. The term CPU is not intended to be limited to a microprocessor, instead it is intended to be used to refer to any device that is capable of processing. The memory buffers 124, CPUs 128, and state machine 132 each communicate with the logic device 120. When the cell 104 is in communication with a crossbar 112, the logic device 120 is also in communication with the crossbar 112. The logic device 120 is also in communication with the I/O subsystem 108. The logic device 120 can be any kind of processor including, for example, a conventional processor, a field programmable gate array (FPGA) 132. The logic device 120 may also be referred to as the cell controller 120 through the specification. The logic device 120 includes a communications bus (not shown) that is used to route signals between the state machine 132, the CPUs 128, the memory buffers 124, the routing device 112 and the I/O subsystem 108. The cell controller 120 also performs logic operations such as mapping main memory requests into memory DIMM requests to access and return data and perform cache coherency functions for main memory requests so that the CPU and I/O caches are always consistent and never stale.

In one embodiment, the I/O subsystem 108 includes a bus adapter 136 and a plurality of host bridges 140. The bus adapter 136 communicates with the host bridges 140 through a plurality of communication links 144. Each link 144 connects one host bridge 140 to the bus adapter 136. As an example, the bus adapter 136 can be a peripheral component interconnect (PCI) bus adapter. The I/O subsystem can include sixteen host bridges 140A, 140B, 140C, . . . , 140P and sixteen communication links 144A, 144B, 144C, . . . , 144P.

As shown, the cell 104 includes fours CPUs 128, however; each cell includes various numbers of processing units 128. In one embodiment, the CPUs are ITANIUM based CPUs, which are manufactured by Intel of Santa Clara, Calif. Alternatively, SUN UltraSparc processors, IBM power processors, Intel Pentium processors, or other processors could be used. The memory buffers 124 communicate with eight synchronous dynamic random access memory (SDRAM) dual in line memory modules (DIMMs) 144, although other types of memory can be used.

Although shown as a specific configuration, a cell 104 is not limited to such a configuration. For example, the I/O subsystem 108 can be in communication with routing device 112. Similarly, the DIMM modules 144 can be in communication with the routing device 112. The configuration of the components of FIG. 1D is not intended to be limited in any way by the description provided.

Figure 2:
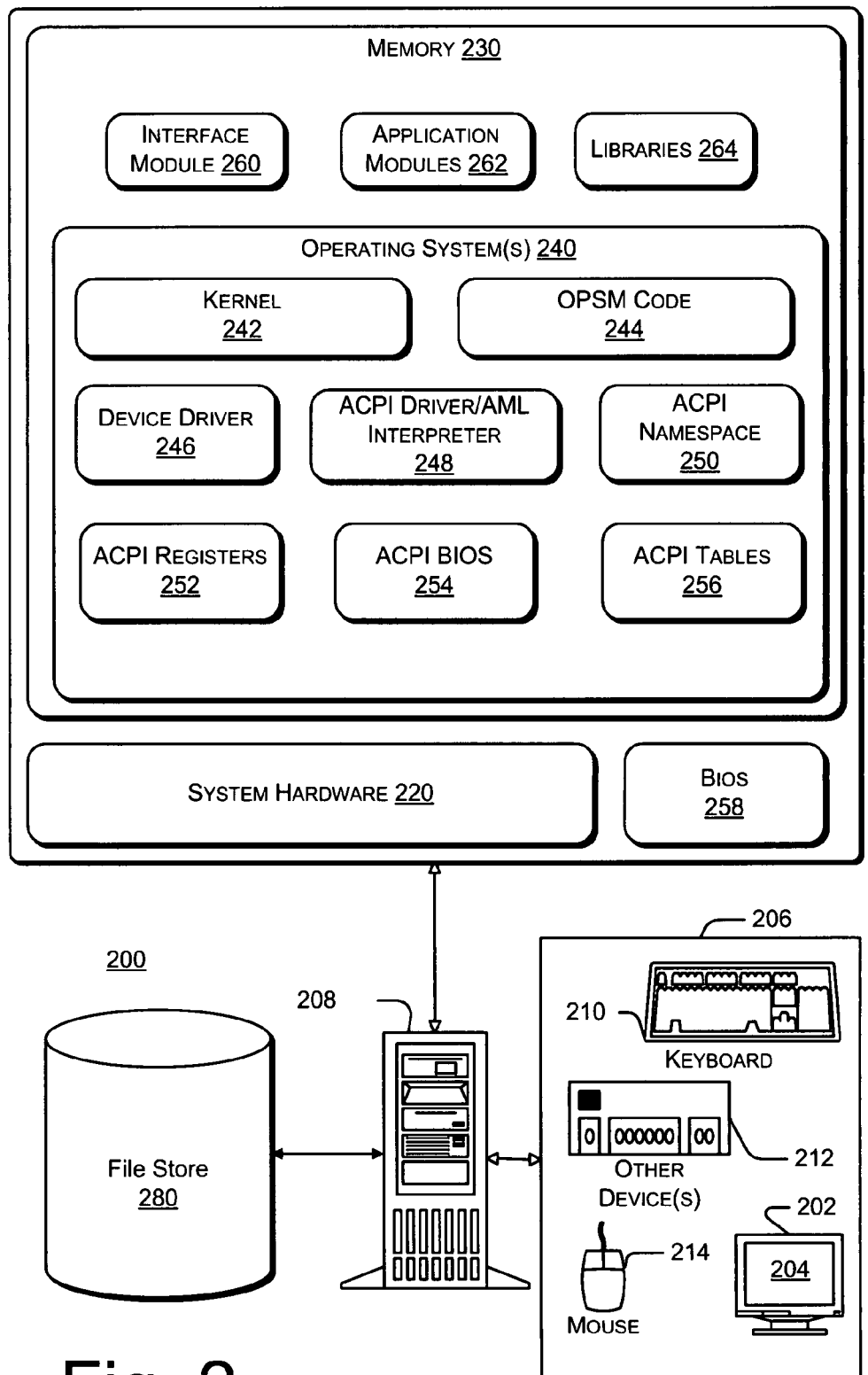
FIG. 2 is a schematic illustration of an embodiment of a computer system that may be used to implement a multiprocessor system as depicted in FIGS. 1A-1D.

FIG. 2 is a schematic illustration of an embodiment of a computer system 200 that may be used to implement a multi-processor system as depicted in FIGS. 1A-1D. The computer system 200 includes a computer 208 and may include one or more accompanying input/output devices 206 including a display 202 having a screen 204, a keyboard 210, other I/O device(s) 212, and a mouse 214. The other device(s) 212 can include a touch screen, a voice-activated input device, a track ball, and any other device that allows the system 200 to receive input from a developer and/or a user. The computer 208 includes system hardware 220 and random access memory and/or read-only memory 230. A file store 280 is communicatively connected to computer 208. File store 280 may be internal such as, e.g., one or more hard drives, or external such as, e.g., one or more external hard drives, network attached storage, or a separate storage network.

Computer system 200 comprises one or more operating systems 240. In operation, one or more application modules 262 and/or libraries 264 executing on computer 208 make calls to the operating system 240 to execute one or more commands on the computer's processor. The operating system 240, in turn, invokes the services of system hardware 220 to execute the command(s). The operating system kernel 242 can be generally considered as one or more software modules that are responsible for performing many operating system functions.

As noted above, in a partitioned computer system each partition may operate a separate operating system 240. The particular embodiment of operating system(s) 240 is not critical to the subject matter described herein. Operating system 240 may be embodied as a UNIX operating system or any derivative thereof (e.g., Linux, Solaris, HPUX etc.) or as a Windows® brand operating system.

Computing system 200 further includes a number of components to facilitate ACPI management functions. Although the subject matter is with reference to ACPI table management, there is no intention to limit the claims to ACPI configuration systems. Rather, the subject matter describe herein may operate with and provide benefits with any operating system, architecture, and/or configuration management system.

In one embodiment, the kernel 242 interfaces with Operating System Power Management (OSPM) system code 244. The OSPM system code 244 comprises one or more software modules that may be a part of the operating system 205 and that may be used to modify the behavior of certain components of the computer system 200, typically to mange power consumption in accordance with pre-configured power conservation settings. The various device drivers 246 interface with and generally control the hardware installed in the computer system 200.

ACPI Driver/AML Interpreter 248 is a software module loaded during system start-up, which functions as an interface between the operating system 240 and an ACPI BIOS 254. ACPI Driver/AML Interpreter 248 populates an ACPI namespace 250 at system startup, loads description blocks from the system BIOS ACPI namespace at run time, handles certain general purpose events triggered by ACPI hardware, and passes other general purpose events to modules registered to handle those events, and the like.

A driver communicates with other drivers and the operating system components (e.g., an I/O manager or the kernel 242), for example in the Windows® 2000 operating system, by passing messages called I/O request packets (IRPs) up and down a "driver stack." As will be understood by those skilled in the art, drivers for a particular hardware device may be "stacked" such that messages directed either down to the hardware device or back up to the operating system (or other program module) are passed through a chain of drivers in a driver stack before reaching their destination. An ACPI driver 248 may be inserted into a driver stack to add functionality to the hardware device.

In one embodiment, the ACPI driver 248 creates a filter Device Object (filter DO) or a Physical Device Object (PDO) in the driver stack for each device described in an ACPI namespace 250. If the device is capable of being enumerated by an element of another subsystem, such as a Plug-n-Play subsystem, that element of the other subsystem may create the PDO for the device and the ACPI driver 248 may put a filter DO on top of the PDO. The operating system 240 provides power management features to the device stack by means of these device objects.

The ACPI BIOS 254 refers to the portion of system firmware that is compatible with the ACPI specification. The ACPI BIOS 254 manages the boot-up process for the computing system 200 the machine and implements interfaces for power and configuration operations, such as, e.g., sleep, wake, and some restart operations. ACPI BIOS 254 contains definition blocks used to construct ACPI Tables 256 such as, e.g., the DSDT and the SSDT. Although the BIOS 258 and the ACPI BIOS 254 are illustrated as separate components in FIG. 2, they may be implemented as one component in the computer system 200.

In some embodiments, the ACPI Tables 256 include a Root System Description Table (RSDT), a Differentiated System Description Table (DSDT) and one or more Secondary System Description Tables (SSDTs).

Figure 3:
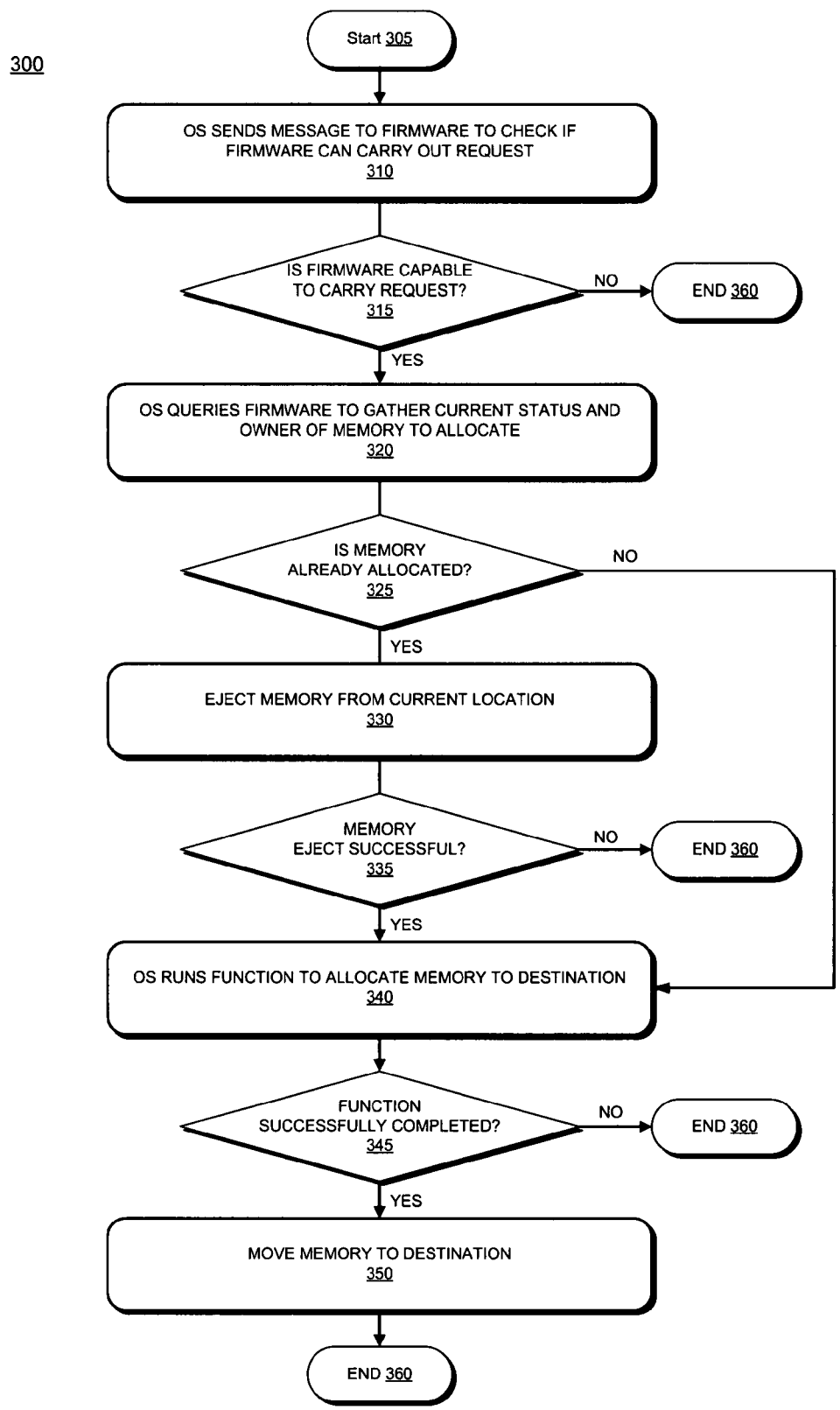
FIGS. 3-6 are flowcharts illustrating operations in a method to allocate/reallocate resources in a multiprocessor computer system according to some embodiments.
Figure 4:
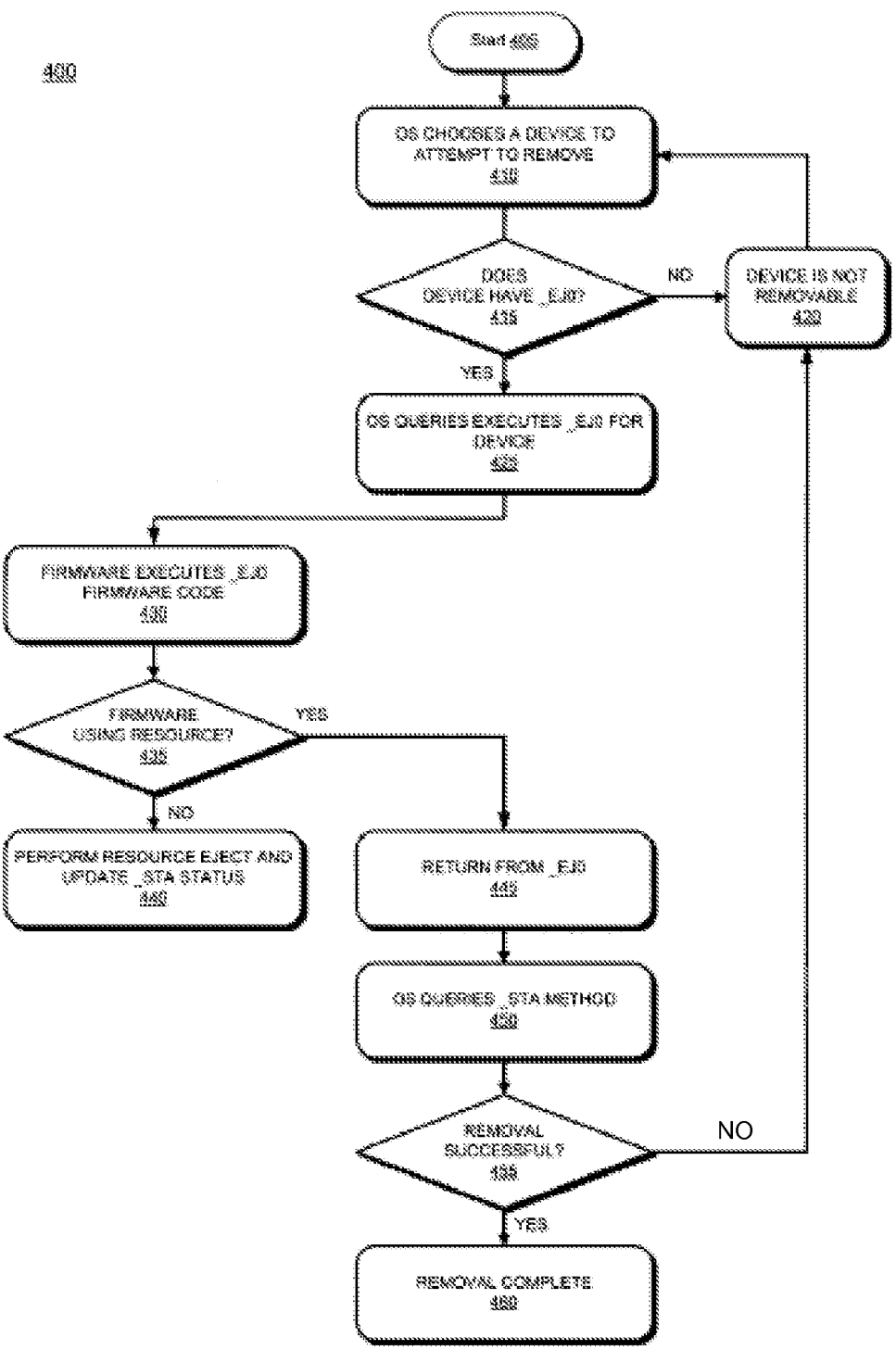

As described above, in some circumstances it may be desirable to allocate and/or reallocate resources from a first partition to a second partition in a multiprocessor computer system. FIGS. 3-4 are flowcharts illustrating operations in a method to allocate/reallocate resources in a multiprocessor computer system according to some embodiments. In some embodiments, the operations illustrated in FIGS. 3-4 may be implemented as logic instructions stored on a computer readable medium and executed on one or more processors as part of a process in, for example, an operating system, alone or in combination with system firmware. The methods illustrated in FIGS. 3-4 may be implemented in a multiprocessor computer such as, for example, the computer system 100" depicted in FIG. 1C.

FIG. 3 illustrates one method 300 in which ACPI methods may be used to allocate/reallocate (e.g., add, remove, assign, reassign, or otherwise transfer/migrate) resources of the computer system to and from the different operating systems of the computer system. Unallocated resources in the computer system 200 which are visible to the different operating systems/partitions can also be allocated or added using the ACPI methods. Generally speaking, to accomplish allocation/reallocation, the operating system of a partition instance that desires a particular resource typically calls the firmware 258 to synchronize the ownership of that resource vis-à-vis the other operating system/partitions. In contrast to conventional methods of resource allocation, rebooting of the computer system 200' is not required to enable the resources to be allocated/reallocated. Rather, in accordance with these embodiments, resource allocation/reallocation can be performed dynamically during operation of the computer system 200.

In some embodiments, any one or more of the hardware resources of the computer system 200, including the memory 130 and/or any of the other system hardware 220, can be allocated/reallocated. Nevertheless, as an example, the flow chart 300 shows process operations that can be performed to cause a reallocation of a memory segment in relation to operating systems (and the partitions managed by those operating systems) of the computer system 200. As one example, the flow chart 300 can be understood to encompass process operations that are performed to cause a reallocation of the third memory segment 130 from a first operating system to a second operating system.

Referring to FIG. 3, upon starting at a operation 305, one or more memory segment(s) of the computer system 200 are allocated (or unallocated) in a particular initial manner. For example, a first memory segment can be initially assigned to/owned by a first operating system (e.g., by the partition affiliated with that operating system). Next at operation 310, a second operating system determines that it desires reallocation of the memory segment to itself. Thus, the operating system invokes the ACPI to initiate a reallocation. The ACPI facilitates the reallocation by means of a Device Specific Method (DSM), which provides device specific control functions to devices in the computer system 200 and is executed in response to a _DSM function call. For example, the _DSM method can be used to allocate a memory resource to any of the various operating systems in the computer system 200.

More particularly, the DSM method, which can be used to perform resource allocation/reallocation for any device in the computer system 200, is performed based upon four arguments, namely, a UUID (Universal Unique Identifier), a Revision ID, a Function Index and Arguments. The UUID is a 128 bit buffer that differentiates the various functions that can be performed on a device in the computer system 200 using the _DSM function call. The Revision ID is unique to the UUID and provides a revision for a function. The Function Index is a number, the meaning of which is unique to the UUID and the Revision ID. When the Function Index is equal to 0, this is indicative of a special query function that returns a buffer specifying all the different function indices that are supported by the computer system 200 for a specified UUID and Revision ID. When the Function Index takes on a non-zero value, is function-specific depending upon the UUID and Revision ID. The DSM method can be placed at any device level that is visible to the OS so that resources currently not visible to the OS can also be added.

In the embodiment depicted in FIG. 3, when the second operating system requests the memory segment, the first operating system attempts to determine if the system firmware 258 is capable of performing the migration of the memory segment by calling the _DSM function at the operation 310. The _DSM function in this example can have a special Function Index of 0. Then, based upon a value returned by the firmware 258 in response to the _DSM function, the OS 10 is able to determine in operation 315 if the firmware 258 is capable of performing the desired memory migration.

If the value returned by the _DSM function call in the operation 315 is 0, this indicates that the firmware 258 is not capable of performing the desired memory migration (e.g., because the firmware is an earlier version of firmware not having such capability) and consequently the process ends at a operation 360. However, if the Function Index value returned by the _DSM function call in operation 315 is 1, then this indicates that the firmware 258 is capable of the functionality appropriate for reallocating the memory segment, and so the process proceeds to operation 320.

Upon reaching the operation 320, the OS queries the firmware 258 again by making another function call. At this time, the purpose of querying the firmware 258 is to obtain information regarding the current status and location of the resource that is of particular interest to the operating system, e.g., the memory segment that is of particular interest to the operating system. In the present example, two distinct function calls are made by the operating system to obtain the status and ownership information, namely, a _STA method for obtaining the status information and a _FPN method for obtaining ownership information. Both of these methods, which are described in more detail below, are used to identify the status/ownership information of the memory segment to be migrated from first operating system to the second operating system. Notwithstanding the use of the _STA and _FPN methods in the present example, in alternate embodiments one or more ACPI_DSM function calls can be employed instead to obtain this information.

Further with respect to the present exemplary embodiment, every resource in the computer system 200 has a status (STA) method to determine the status and an F-Pars Number (FPN) method to determine the ownership of the resource in the computer system 200. Knowledge of the current ownership of a resource is significant since, in the present embodiment, an OS can only delete a resource that it owns. The firmware 258 will communicate the ownership of the memory segment via the FPN method, which also is an ACPI method and is executed in response to a _FPN function call. The FPN method maintains the ownership of the resource in terms of the OS, which manages the resource and the virtual partition to which the resource belongs. The return value of the _FPN function call conveys the current owner of the memory segment.

As for the STA method, this method is another ACPI method that determines the status of a resource in the computer system 200, which is executed in response to the calling of a _STA function. In the present embodiment, the _STA function call is 32 bits long and does not take any arguments like the DSM method. The different bits of the function call reflect the status of a device in the computer system 200.

More particularly, the status of a device can be one of the following: enabled, disabled or removed. A bit 0 of the STA method function call, which represents the right-most or the least significant bit (LSB), is set if a given device is present in the computer system 200. A bit 1 is set if the device is enabled and decoding its hardware resources. If the bit 0 is cleared, then the bit 1 should also be cleared since a device which is not present in the computer system 2 cannot be enabled. Additionally, a bit 2 of the STA method function call is set if the device should be shown in the user interface (not shown) associated with the computer system 2. Further, a bit 3 is set if the device is functioning properly and a bit 4 is set if the device has a battery. Bits 5-31 are reserved bits which typically should be cleared. A set bit represents a logic level 1 in digital electronics. while a cleared bit represents a logic level 0.

The different bits of the STA method/function call are updated after every function call to reflect the outcome of the function call in the computer system 200. The STA method can be called at any point of time during the allocation/reallocation of a resource to determine the current status of the resource. By looking at the return values of the _STA and _FPN function calls executed in response to the DSM method in the operation 320, the operating system determines the status and owner of the memory segment.

In some embodiments, the devices in the computer system 200 are arranged in a tree structure maintained by the firmware 258. The various devices in the tree structure, including the devices that may or may not be currently assigned to a virtual partition (hence, may or may not be managed by the various operating systems are visible to the various operating systems, by means of those operating systems requesting the tree structure from the firmware 258 and further traversing the tree in the computer system 200. By traversing the tree, the operating system can also determine the location of the memory segment in the tree hierarchy.

Upon determining the owner, status and location of the memory segment at the operation 320, the process moves to operation 325 at which the operating system 10 determines whether the memory resource of interest has already been allocated to an operating system/partition or not, based upon the response of the FPN and STA methods executed in the operation 320. In embodiments in which the operating system desires the memory segment, the first operating system 10 determines that the memory segment 30 has been initially assigned to the second operating system 12, and so the response to the _DSM ACPI method would be an indication that the memory segment is currently owned by the first operating system. However, in other circumstances, the memory segment (or other memory segment or other resource) can be assigned to other virtual partitions/operating systems, or even be an unused resource that, although not owned by any operating system, is still visible to all of the operating systems and capable of being added to any operating system/virtual partition in the computer system 200.

If at the operation 325 the operating system determines that the desired memory resource is not already allocated, then the process proceeds to a operation 340, which is described in further detail below. However, if at the operation 325 the operating system determines that the desired memory resource is already allocated, then the process advances to a operation 330, at which a memory ejection operation is performed in relation to the desired memory resource by the operating system currently having ownership of the desired memory resource (otherwise, if the operating system desiring the memory resource proceeded to request allocation of the resource to itself, that request would be rejected). (Also, if the operating system currently having ownership may not eject the memory resource, then the request would also be rejected.) In the example of FIG. 1, the memory segment is initially assigned to the second operating system and yet the first operating system desires reassignment of that memory segment to itself. For that reason, in some embodiments, the process proceeds from the operation 325 to the operation 330 to accomplish the freeing-up of the desired memory segment.

More particularly, to perform a memory delete operation, an ACPI eject method is executed at the operation 330 by means of a _EJx function call (where the "x" in _EJx represents the different sleeping states supported by a resource and can range from 0-4). The eject method allows for the dynamic removal or ejection of a resource from the operating system currently having ownership of the resource by making a _EJ0 function call. In the present example, the first operating system, which currently owns the memory segment) makes the _EJ0 function call at the operation 330 to attempt to de-allocate the desired memory segment before the second operating system can allocate the memory segment to itself.

Although devices are most commonly ejected by means of the _EJ0 function call, other eject function calls, for example, _EJ1, _EJ2, _EJ3 or _EJ4 can also be used to facilitate the removal of a resource from the operating system managing the resource. Further, while all resources in the computer system 200 support the eject method, in other embodiments not every resource can be ejected. In such embodiments, whether a given resource can be ejected is determined by the firmware 258, which only provides the _EJx function call on resources that can be ejected. Also, in some alternate embodiments, when it is determined that a memory segment desired by an operating system is already allocated, rather than ejecting that memory segment, the operating system instead can traverse the tree structure and query the various memory segments which are part of the tree to find a memory segment that is able to be allocated to the operating system.

Assuming that a memory resource of interest (e.g., the memory segment) can be ejected, the operating system 10 will execute the eject method on that memory resource by calling the _EJ0 function and consequently proceed to a operation 335 where the outcome of the _EJ0 function call/method is determined. More particularly, at the operation 335, a _STA function call is executed in response to the execution of the _EJ0 function call, and the different bits of the _STA function call determine if the memory was successfully ejected. In the present example in which the memory segment is desired by the operating system 10, a bit 1 of the _STA method for that memory segment (which was set before the _EJ0 function call to reflect ownership by the operating system) will be cleared if the _EJ0 function call successfully completed ejection, indicating that the memory segment is no longer owned by the operating system.

If it is determined at the operation 335 that the _EJ0 method of the operation 330 failed to eject the memory resource of interest (e.g., the memory segment, then the bit 1 will remain set, indicating that the original ownership allocation of that memory resource (e.g., to the first operating system) remains intact and that the memory resource cannot be ejected or migrated. If this occurs, then the process of the flow chart 300 progresses to a operation 360, at which point the process ends (albeit, in some alternate embodiments, the process could then repeat the operation 330 on one more occasions to realtempt ejection). However, if at the operation 335 it is determined that the _EJ0 method completed successfully, the ejected memory resource (e.g., the segment) can then be allocated to the OS desiring that resource (e.g., the second operating system), and so the process advances to the operation 340.

As discussed above, the process of the flow chart 300 is capable of attaining the operation 340 either because the desired memory resource was successfully ejected as determined in the operation 335 or because the desired memory resource was determined at the operation 325 as being currently not allocated. In either case, if the process reaches the operation 340, it is because the resource that is desired (e.g., the memory segment) is free for allocation. Upon reaching the operation 340, the second operating system then calls another DSM ACPI method (more particularly, a _DSM function call) that is intended to cause the allocation/migration of the desired memory resource to the second operating system.

The ACPI methods cannot be called on devices that are not owned by any operating systems, the ownership being determined by the FPN and STA methods. Nevertheless, as mentioned above, all of the devices/resources in the computer system 200 are arranged in a tree structure which is visible to the operating systems, where the root of the tree is _SB_. In some embodiments, this tree structure may be utilized to facilitate the allocation or reallocation of resources that are part of the tree structure but are not currently owned by any of the various operating systems e.g., memory resources that have been ejected. More particularly, the _DSM function call executed in the operation 340 may be executed from the root (_SB_) of the tree rather than from individual devices. Notwithstanding that this is usually the case, the ACPI DSM method can also be called for individual devices in the tree as long as a parent resource of the device (for which the DSM method is called) in the tree has a _DSM function available. For example, in the present embodiment, the _DSM method is placed at _SB_ to be able to add any memory segment in the computer system 200. In alternate embodiments, the _DSM method can be put at a different level to allocate devices as long as it is at a level above the resources that are desired to be allocated. This enables the OS to allocate resources not currently allocated to the OS which otherwise would not be possible under ACPI.

In general, the various ACPI methods of the operation 340 and the other above-discussed operations are executed in the OSs using ACPI Machine Language (AML), which is the language that the ACPI interpreter understands. However, in at least some embodiments, the ACPI_DSM function call of the operation 340, in addition to causing migration of a memory resource such as the memory segment, also moves the code for performing the addition into the firmware 258 via an A1 OpRegion that is capable of running ACPI Machine Language (AML). The A1 OpRegion serves as a link or hook in AML and ACPI to enable calling of non-AML code from within an ACPI function. This allows for the execution of normal firmware code (non-AML) to perform the addition of the memory segment.

Upon performing the operation 340 intended to cause the reallocation of a memory resource (e.g., the memory segment) to the OS desiring that memory resource (e.g., the first operating system), at operation 345 it is then determined whether the reallocation was successfully completed. More particularly, the status of the migration of the memory resource to the virtual partition managed by the operating system desiring that memory resource is determined by a return value of the _DSM ACPI method called in operation 340. If at the operation 345 it is determined that the migration was unsuccessful, then the process ends by progressing to the operation 360. However, if it is determined that the allocation of the memory resource to the virtual partition managed by the operating system desiring that memory resource has in fact been successful, then the process proceeds to a operation 350.

Assuming that the allocation of the memory resource has been successfully achieved in the operation 345, this is not to say that the process of migrating the memory resource has in fact been completed. Rather, subsequent to the performance of the operation 345, the internal states of the STA and FPN methods are updated in operation 350 to reflect the new assignment of the memory resource to the appropriate OS/virtual partition. Thus, in the present example in which the memory segment 30 has been moved from the first operating system to the second operating system, at the operation 350 the internal states of the STA and FPN methods are updated to reflect this transition. Upon completion of the operation 350, the process advances again to the operation 360, at which the process is completed.

In some embodiments, it may be useful to provide a mechanism to designate one or more resources of the computer system as being unremovable, i.e., that the resource cannot be ejected from the operating system to which it is attached. One embodiment of a method is depicted in FIG. 4. Referring to FIG. 4, the method begins at 405, and at operation 410 the operating system chooses a device to attempt to remove/eject.

For example, an operating system may choose to remove or eject a memory device. As described with reference to FIG. 3, the operating system may determine whether the device has an _EJ0 call available to the system firmware.

If, at operation 415, the device does not have an _EJ0, then the device may be flagged as being not removable (operation 420). The flag may be stored in a memory module in the computer system 200. By contrast, if at operation 415 the device has an _EJ0 then control passes to operation 430 and the system firmware executes an _EJ0 firmware code for the requested device.

If, at operation 435, the system firmware is not using the resource, then control passes to operation 440 and the resource is ejected and the _STA status of the resource is updated in memory. By contrast, if at operation 435 resource is being used by the system firmware, then control passes to operation 445 and control returns from the system firmware _EJ0 call. At operation 450 the operating system queries the _STA method to determine the status of the device.

If, at operation 455, the device removal is unsuccessful then control passes to 420 and the device is flagged as being unremovable. By contrast, if at operation 455 the removal was successful, then control passes to operation 460 and removal is complete.

Figure 5:
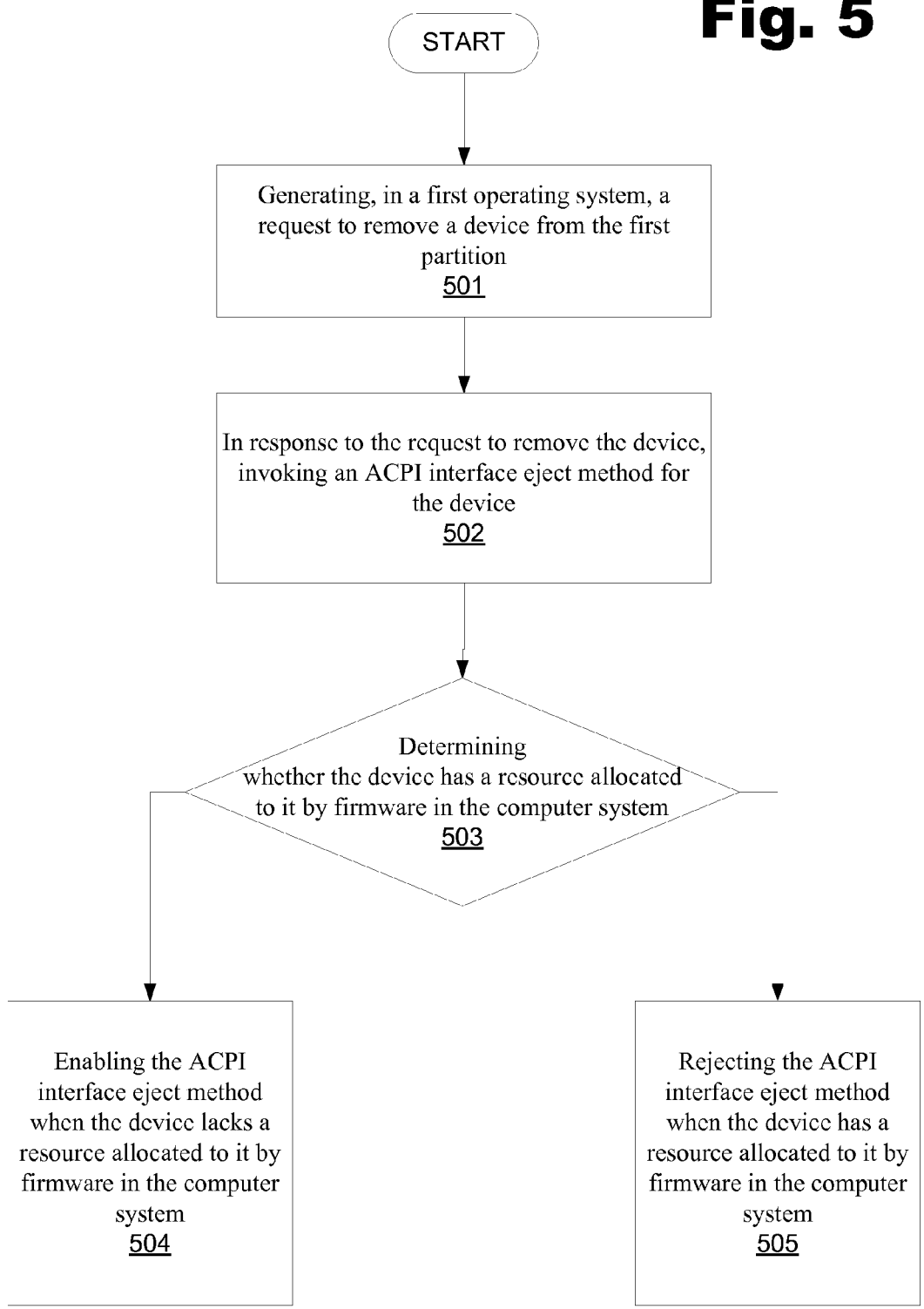

FIG. 5 illustrates the following. A method to eject a device in a multiprocessor computer system includes at least a first partition having a first operating system and a second partition having a second operating system. This method includes: generating (501), in a first operating system, a request to remove a device from the first partition; in response to the request to remove the device, invoking (502) an ACPI interface eject method for the device; determining (503) whether the device has a resource allocated to it by firmware in the computer system; and rejecting (505) the ACPI interface eject method when the device has a resource allocated to it by firmware in the computer system or enabling (504) the ACPI interface eject method when the device lacks a resource allocated to it by firmware in the computer system.

Figure 6:
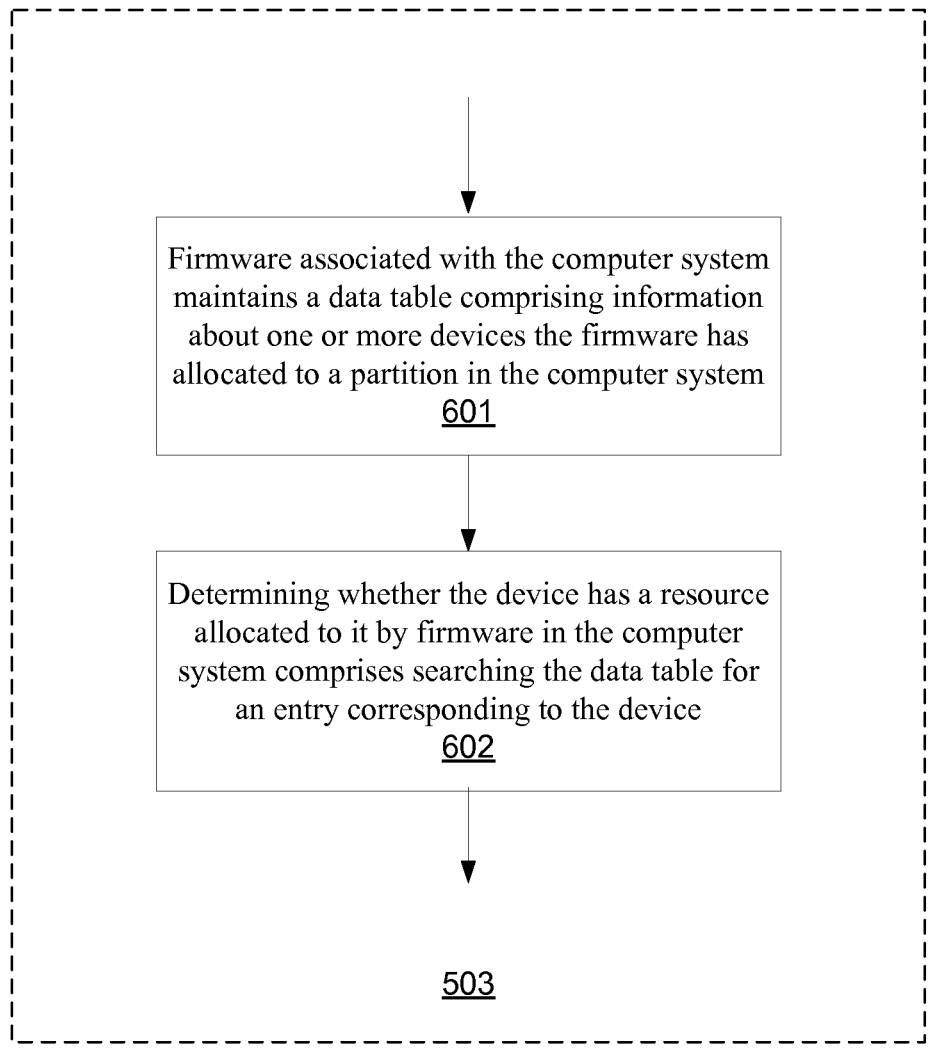

FIG. 6 illustrates that firmware associated with the computer system maintains (601) a data table comprising information about one or more devices the firmware has allocated to a partition in the computer system. Determining whether the device has a resource allocated to it by firmware in the computer system includes searching (602) the data table for an entry corresponding to the device.

While the methods described above represent examples of a processes by which memory resources can be allocated/reallocated among the operating systems/partitions of a computer system in a dynamic manner, the subject matter described herein is also intended to encompass a variety of other processes, including modifications and/or refinements of the above-described process, allowing for resource allocation/reallocation. The particular ACPI methods employed above to facilitate resource addition and deletion, the operations followed to facilitate resource addition for a device in the computer system and other features could all be varied depending upon the type/needs of the computer system being used and the device being added.

Also, as already noted above, the subject matter described herein is intended to encompass processes in which not merely memory but also other hardware resources (and even firmware, or other resources) are moved among partitions managed by different operating systems (or possibly other processes). In alternate embodiments, resource addition, allocation, and/or reallocation can be performed in environments other than a virtual partition environment, both where unused resources are added to an operating system as well as where resources are moved between different operating systems.

Embodiments described herein may be implemented as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Reference in the specification to "one embodiment" or "an embodiment" means that a particular feature, structure, or characteristic described in connection with the embodiment is included in at least one implementation. The appearances of the phrase "in one embodiment" in various places in the specification are not necessarily all referring to the same embodiment.

What is claimed is:

1. A method to eject a device in a multiprocessor computer system comprising at least a first partition having a first operating system and a second partition having a second operating system, comprising:
   generating, in a first operating system, a request to remove a device from the first partition;
   in response to the request to remove the device, invoking an ACPI interface eject method for the device;
   determining whether the device has a resource allocated to it by firmware in the computer system; and
   rejecting the ACPI interface eject method when the device has a resource allocated to it by firmware in the computer system.

2. The method of claim 1, wherein invoking an ACPI interface eject method for the device comprises invoking an ACPI _EJ0 method.

3. The method of claim 1, wherein:
   firmware associated with the computer system maintains a data table comprising information about one or more devices the firmware has allocated to a partition in the computer system; and
   determining whether the device has a resource allocated to it by firmware in the computer system comprises searching the data table for an entry corresponding to the device.

4. The method of claim 1, further comprising enabling the ACPI interface eject method when the device lacks a resource allocated to it by firmware in the computer system.

5. The method of claim 1, further comprising updating a status of the device when the ACPI interface eject method is executed.

6. The method of claim 5, further comprising removing the device from the first partition.

7. The method of claim 6, further comprising allocating the device to a second operating system.

8. A multiprocessor computer system comprising:
   at least a first partition having a first processor and a first operating system and a second partition having a second processor and a second operating system, comprising:
   logic in the first operating system to generate a request to remove a device from the first partition;

logic in a firmware module in the computer system to:
- invoke an ACPI interface eject method for the device in response to the request to remove the device;
- determine whether the device has a resource allocated to it by firmware in the computer system; and
- reject the ACPI interface eject method when the device has a resource allocated to it by firmware in the computer system.

9. The computer system of claim 8, wherein the logic to invoke an ACPI interface eject method for the device comprises logic to invoke an ACPI _EJ0 method.

10. The computer system of claim 8, wherein:
- firmware associated with the computer system maintains a data table comprising information about one or more devices the firmware has allocated to a partition in the computer system; and
- determining whether the device has a resource allocated to it by firmware in the computer system comprises searching the data table for an entry corresponding to the device.

11. The computer system of claim 8, further comprising enabling the ACPI interface eject method when the device lacks a resource allocated to it by firmware in the computer system.

12. The computer system of claim 8, further comprising updating a status of the device when the ACPI interface eject method is executed.

13. The computer system of claim 12, further comprising removing the device from the first partition.

14. The computer system of claim 13, further comprising allocating the device to a second operating system.

\* \* \* \* \*